United States Patent [19]

Kakko-Chiloff

[11] Patent Number: 5,058,472
[45] Date of Patent: Oct. 22, 1991

[54] ROTARY CUTTING APPARATUS

[75] Inventor: Nicolas Kakko-Chiloff, Olivet, France

[73] Assignee: Usinage Montage et Assistance Technique (U.M.A.T.), Loiret, France

[21] Appl. No.: 501,935

[22] Filed: Mar. 30, 1990

[30] Foreign Application Priority Data

Mar. 30, 1990 [FR] France ................................ 89 04153

[51] Int. Cl.⁵ .............................................. B26D 1/62
[52] U.S. Cl. ......................................... 83/344; 83/481; 83/560; 83/698
[58] Field of Search .................. 83/343, 344, 341, 479, 83/481, 512, 560, 562, 571, 674, 346, 698

[56] References Cited

U.S. PATENT DOCUMENTS 3,448,684 3/1967 Cardinet et al. ...................... 83/344
4,759,247 7/1988 Bell et al. .............................. 83/344

Primary Examiner—Mark Rosenbaum
Assistant Examiner—Allan M. Schrock
Attorney, Agent, or Firm—Browdy and Neimark

[57] ABSTRACT

The apparatus comprises a frame supporting an upper cutting cylinder and a lower cutting cylinder placed between two parallel and vertical uprights. A removable cassette is made of two pairs of blocks vertically slidable in two rectangular apertures and formed into the upper horizontal faces of the two uprights. Two opposite coaxial spindles of the upper cutting cylinder are rotatively mounted in the two opposite upper sliding blocks. Two opposite coaxial spindle of the lower cutting cylinder are rotatively mounted in the two opposite lower sliding blocks. On each side of the removable cassette, the upper and lower sliding blocks are connected together by a resilient coupling device.

8 Claims, 3 Drawing Sheets

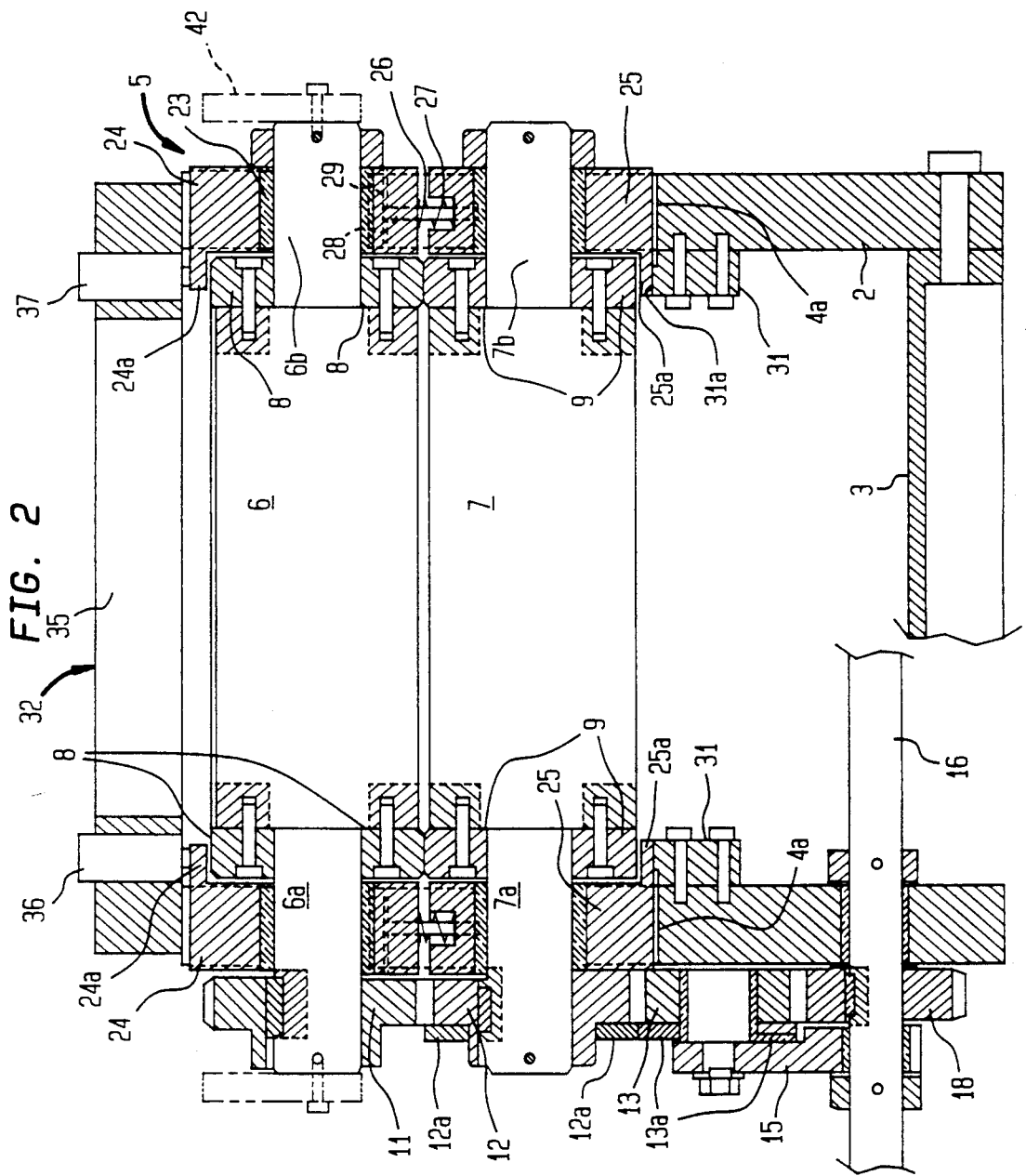

5,058,472

ROTARY CUTTING APPARATUS

FIELD OF THE INVENTION

The present invention relates to a rotary cutting apparatus usable more particularly in the printing and shaping lines of foldable carboard boxes and self-adhesive labels.

BACKGROUND OF THE INVENTION

Such apparatus is generally based on the rolling principle, one on the other, of two superimposed cutting cylinders, with parallel axes, one of them being engraved in raised relief and the other one being smooth. In some processes however, the two cylinders can carry complementary engraving. The driving in rotation of the cylinders, at the same peripheral speed but in a reverse direction to one another, is provided by connection gears having the same pitch diameter chosen so that there remains, between the two cutting cylinders, a short and constant distance necessary for ensuring a good cut of the cardboard or paper web passing therebetween, without nevertheless any contact between the rotary parts performing the cut.

The gap separating the two cutting cylinders of parallel axes is provided by rolling rollers which are fixed to the ends of the two cylinders while being perfectly concentrical therewith. The diameter of each of these rolling rollers is equal to the pitch diameter of the connection gear. Thus, the cutting pressure can be applied without restriction on the two cylinders.

The diameter of the cutting cylinders which depends of the cut out format has also to be determined, as a function of the web width, in such manner that the deflections applied during the cutting operation, added to the execution tolerances, are not superior than to the theoretical distance separating the cutting parts. The deflections which appear during the cutting operation have two origins, viz. the deflection as such of the cylinders under the effect of a load which is punctual or uniformly distributed, due to the cutting effort, and the deflection caused by the sagging moments due the effort exerted on the cylinder spindles. The first deflection can be attenuated only by increasing the diameter of the cutting cylinders. The second deflection can be totally eliminated by applying the cutting pressure directly on the rolling rollers. This pressure is generally applied by means of two shafts of large diameter, with axes parallel to the axes of the cutting cylinder and placed respectively above and below these two cylinders. These shafts, the rotation of which can be free, are made interdependent with rolling rollers which are mounted in opposition with respect to the rolling rollers of the cutting cylinders and which roll on the latter. The pressure necessary for the cutting operation is then applied on the spindles of the two shafts, and this pressure is transmitted to the cutting cylinders via the rolling rollers in contact with one another, therefore without passing via the spindles of the cutting cylinders, thereby avoiding the deformation which would otherwise occur.

Such a known cutting apparatus has obviously the disadvantage to have a particularly complex and costly structure. Another disadvantage of this known cutting apparatus is associated with the format changing operation. Actually, when there is such an operation, it is necessary to preserve a same level to the plane of the cardboard or paper web to be cut so as not to render the subsequent operations complex to accomplish. Therefore, for each change of format, one has to be sure that the meshing of the connecting gears, whose position varies, with the control gear is correct. This meshing can be obtained by means of a swivel arm which has to be offset and then set back when there is a change of format. In order to facilitate this operation, the swivel arm can be provided with a pneumatic jack and the gears with rolling rollers.

With a view of reducing the adjustment idle times, all these considerations lead to provide, for each new format, a complete interchangeable cutting device or "cassette" including, in addition to the cylinders for format cutting, all the other elements necessary for the cutting operation. In other words, for each change of format, the cutting device as such which corresponds to the preceding format is replaced by a new cutting device corresponding to the new format, with the control alone remaining on the machine bed. This operation entails heavy and complex handlings and increases highly the cost of the format toolings.

The object of the present invention is to remedy these disadvantages.

SUMMARY OF THE INVENTION

To this effect, this rotary cutting apparatus including a frame supporting, between two parallel and vertical uprights, two superimposed cutting cylinders, with parallel axes, viz. an upper cutting cylinder and a lower cutting cylinder, is characterized in that it comprises a removable cassette made of two pairs of blocks vertically slidable in two rectangular apertures formed respectively in the upper portions of the two uprights and opening into the upper horizontal faces of these uprights, viz. two opposed upper blocks in which are respectively rotatably mounted two opposed coaxial spindles of the upper cutting cylinder and two opposite lower sliding blocks in which are respectively rotatably mounted two opposed coaxial spindles of the lower cutting cylinder, and in that, on each side of the removable cassette, the upper and lower sliding blocks are connected together by a resilient coupling device tending to lift the upper sliding block with respect to the lower sliding block and authorizing a limited vertical stroke of the upper sliding block with respect to the lower sliding block.

BRIEF DESCRIPTION OF THE DRAWINGS

An embodiment of the present invention will be described hereafter by way of a non limiting example, with reference to the accompanying drawings, wherein:

FIG. 2 is a vertical and transverse sectional view taken along line II-II of FIG. 1.

DISCLOSURE OF PREFERRED EMBODIMENTS

Figure 1:
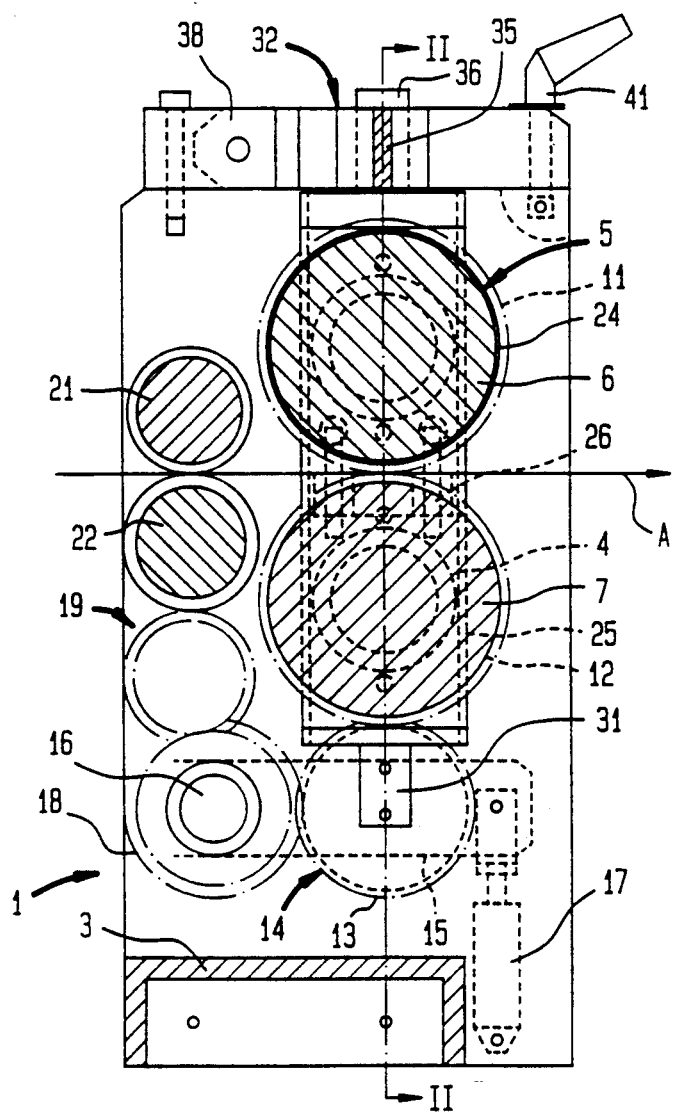
FIG. 1 is a vertical and longitudinal sectional view of the rotary cutting apparatus according to the invention.
Figure 3:
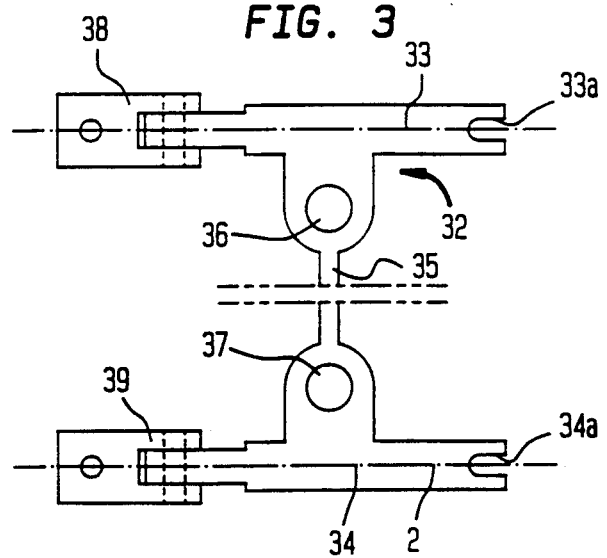
FIG. 3 is a plan view of the pressurizing upper frame of the cutting apparatus.
Figure 4:
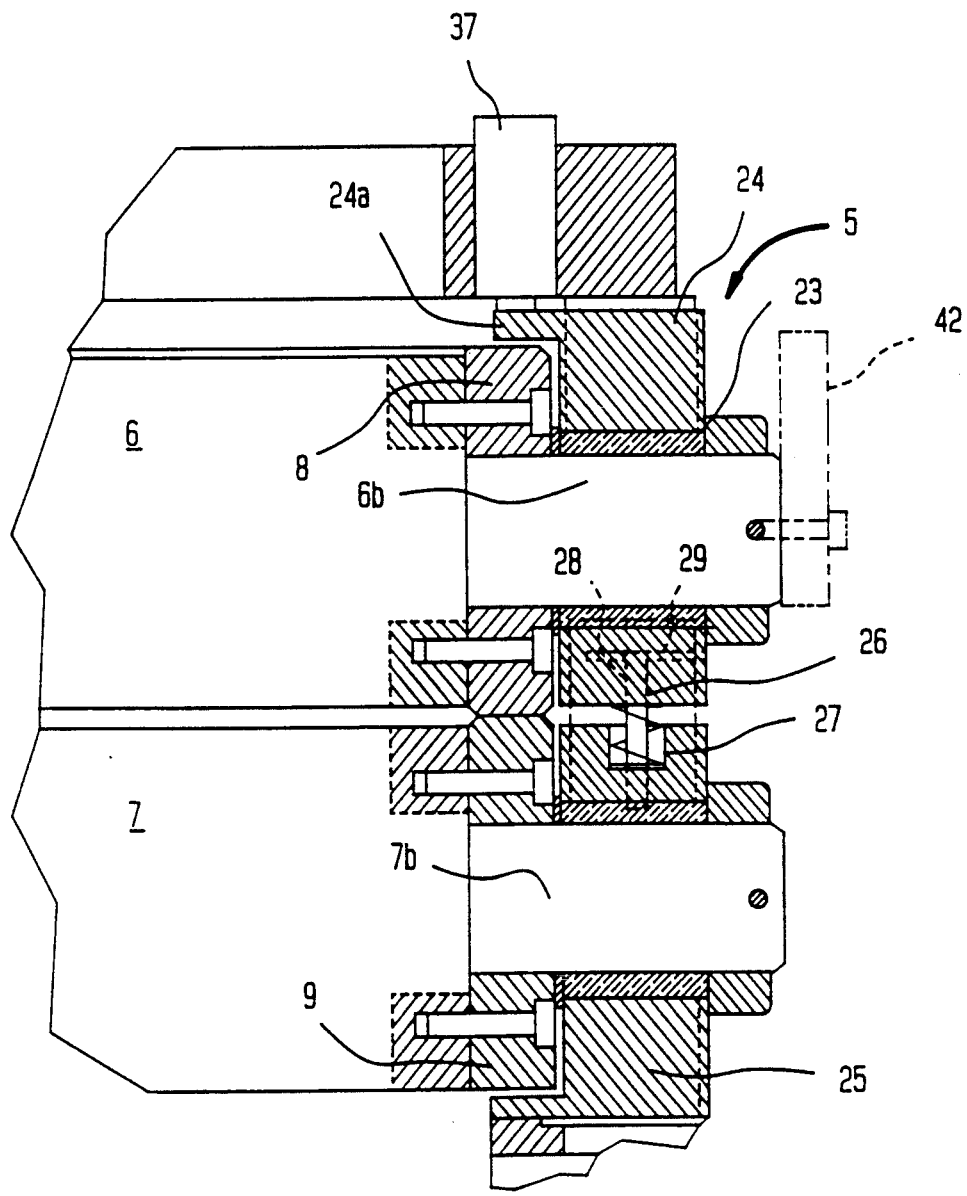
FIG. 4 is an enlarged view of a portion of FIG. 2 showing coupling member 26 in greater detail.

The rotary cutting apparatus shown in FIGS. 1 to 3 comprises a frame made of two parallel uprights 1, 2 connected together by crossbeams, and in particular by a lower horizontal crossbeam 3. Each one of the uprights 1, 2 is formed with a notch in its upper portion, in the shape of an aperture 4 extending vertically, of a rectangular shape and opening into the upper horizontal face of the upright. In the two opposite apertures 4 is engaged an interchangeable cutting device 5, made of a removable simplified "cassette". This cassette 5 comprises essentially two upper 6 and lower 7 cutting cylinders, with horizontal and transverse axes, between which moves a paper or cardboard web A to be cut, moving horizontally in the longitudinal direction. The upper cutting cylinder 6 is rigidly connected at its two ends to two coaxial spindles 6a, 6b and to two upper rolling rollers 8 which are disk shaped with a hole through their center to accommodate passage of spindles 7a, 7b. The rollers 8 are respectively fixed to the two side flat faces of the cylinder 6, by means of screws, and, in the same manner, the lower cutting cylinder 7 is rigidly connected at its two ends to two coaxial spindles 7a, 7b and to two lower rolling rollers 9 having the same shape as rollers 8 respectively fixed to the two side flat faces of the cylinder 7 by means of screws. The upper 8 and lower 9 rolling rollers which roll on another, have a same diameter which is slightly superior than that of the cutting cylinders 6, 7 so as to maintain between cylinders 6, 7 a small gap necessary for providing a good cut of the cardboard or paper web passing therebetween, without existing nevertheless a contact between the metallic parts ensuring the cut. The diameter of the rolling rollers 8, 9 is equal to the pitch diameter of connection gears 11, 12 respectively rigidly connected to the left-hand side spindles 6a, 7a (in FIG. 2) of the cutting cylinders 6, 7 outside the left-hand side uprights 1. These connection gears 11, 12 are meshing with one another and the lower gear 12 is in turn in mesh with a gear 13 which is part of a swivel arm 14 and the arc of movement of which, in a longitudinal vertical plane, is substantially in alignment with the vertical sliding axis of the cassette 5. The gears 12, 13 are respectively rigidly connected to rolling rollers 12a, 13a which are disk shaped with a hole through their centers to accommodate the shafts of gears 12 and 13. Rolling rollers 12a, 12b come in contact with one another when the gears 12, 13 are in mesh. The swivel arm 14 includes a horizontal lever 15 carrying the gear 13 situated underneath the gear 12, which is articulated at one end about a general control or driving transverse shaft 16, and the other end of which is coupled to the upper end of the stem of a lower vertical jack 17, for example of the pneumatic type. Thus, the lever 15 can pivot about axis of the shaft 16, while driving with it the connection gear 13. This connection gear 13 is in mesh with a driving gear 18 rigidly connected to the driving shaft 16. This gear 18 is also connected, via a gear train 19, to a pair of upper 21 and lower 22 feeding cylinders, between which passes the paper of cardboard web A at the inlet of the cutting apparatus.

The spindles 6a, 6b and 7a, 7b of the cutting cylinders 6, 7 are respectively engaged, via roller bearings 23, in upper 24 and lower 25 superimposed blocks engaged with a tight fit in the apertures 4, and which can slide vertically in the latter. These sliding blocks 24, 25 have a same parallelepipedal shape and they have the same outer size whatever the format of the cutting cylinders 6, 7. The two upper 24 and lower 25 blocks, which are superimposed on one another in the same side aperture 4, are connected together by a resilient coupling device 26 placed therebetween. This coupling device 26 comprises a spring 27, made for example of Belleville washers, which is interposed between the two blocks 24 and 25 so as to slightly lift the upper block 24 and the upper cutting cylinder 6 with respect to the lower block 25 when the two blocks 24, 25 are free. On the other hand, each coupling device 26 comprises a vertical bolt 28 fixed at the upper portion of the lower block 25, extending through a hole formed in the lower portion of the upper block 24 and through which extends, at its upper end, a horizontal pin 29. This pin 29 forms an abutment limiting the relative upward movement of the upper block 24 under action of the spring 27, with respect to the lower block 25.

Each upper sliding block 24 is extended inwardly into the apparatus, at its upper portion, by an overhanging portion 24a extending above an upper rolling roller 8. In the same manner, each lower sliding block 25 is extended inwardly, at its lower portion, by an overhanging portion 25a extending below a lower rolling roller 9 and above a fixed added abutment 31. This abutment 31 is fixed by means of screws on the inner face of the corresponding upright 1, 2 so that its upper horizontal face 31a is situated at a level which is slightly superior than that where is the lower edge 4a of the aperture 4. Thus, the overhanging inner portion 25a of the lower sliding block 25 is normally bearing on the upper face 31a of the added abutment 31 and the lower face of the lower sliding block 25 is slightly spaced apart from the lower edge 4a of the aperture 4.

The rotary cutting apparatus according to the invention comprises at its upper portion, a pressurizing frame 32 having substantially, as seen in a plane view, the shape of an "H", as may be seen in FIG. 3. This pressurizing frame 32 includes two side branches 33, 34 extending in the longitudinal direction, and which are connected by a central cross-beam 35. This crossbeam 35 carries at its ends which are connected to the two side branches 33, 34. The width of cross-beams 35 is greater than the rest of the cross-beam 35. Two pressurizing vertical jacks 36, 37 the stems of which extend downwardly, are respectively located on the greater widths of crossbeam 35. The lower ends of these stems are positioned just above the overhanging portions 24a of the upper sliding blocks 24 and in contact therewith. The pressurizing frame 32 is articulated as a whole, on one side about a transverse axis and the side branches 33, 34 are therefore pivotally mounted, at one of their ends, on respective clevises 38, 39 carried by the upper portions of the two uprights 1, 2. At their opposite ends, the side branches 33, 34 are formed with respective notches 33a, 34a for receiving blockage levers 41 pivotally mounted about transverse axes on the upper portions of the two uprights 1, 2.

When the rotary cutting apparatus according to the invention is set in pressure, as shown in continuous lines in FIGS. 1 and 2, the pressurizing frame 32 extends horizontally and is blocked on the horizontal upper faces of the two uprights 1, 2 by means of the two blocking levers 41. In this position, when the two jacks 36, 37 are fed with pressure, their stems are pushed downwardly, and the two upper sliding blocks 24 (and the upper cutting cylinder) are pushed back downwardly, thereby causing the crushing of the springs 27. The pressure of each of the jacks 36, 37 is exerted in the vertical and longitudinal plane lying on the axis of the corresponding jack 36, 37 and consequently substantially in the median plane of the superimposed rolling rollers 8, 9. At the lower portion, this pressure is absorbed by the added fixed abutment 31. Therefore, the flexural moment which is normally exerted on each of the spindles 6a, 6b, 7a, 7b of the cylinders 6, 7 is cancelled. On the other hand, the swivel arm 14, under the action of the flexible pressure of the pneumatic jack 17, is lifted and the gear 13, carried by lever 15, is in mesh with the lower connection gear 12 so as to ensure the transmission of the rotary movement between the driving shaft 16 and the two cutting cylinders 6, 7.

When there is a change of format, an operation which is very simple to carry out, the pressurizing frame 32 is first opened. For so doing and once the levers 41 have been unblocked and retracted, the pressurizing frame 32 is pivoted counter-clockwise (in FIG. 1) about the transverse axis defined by the two clevisses 38, 39 in order to bring it in a substantially vertical position. Thereafter, one proceeds to the removal of the previously used cassette 5 by lifting the upper cutting cylinder 6 by means of a tackle 42 shown in chain-dot lines in FIG. 2. When this upper cutting cylinder 6 is being lifted, it moves at first alone over a short distance, then it entrains therewith the lower cutting cylinder 7 via the resilient coupling devices 26. Thus, the cassette 5 can be totally extracted from the two apertures 4 of the uprights 1, 2, and then be replaced by a new cassette 5 including two cutting cylinders 6, 7 having a different diameter corresponding to the new format.

When the cassette 5 is extracted from the apertures 4, the swivel arm 14 pivots on its own, upwardly and counterclockwise, in FIG. 1 under the effect of the "flexible" pressure of the pneumatic jack 17. Thus, the gear 13 is slightly lifted above the position which it normally occupies during the operation of the cutting apparatus. Consequently, when the new cassette 5 has completely descended, the lower connection gear 12 of this cassette comes automatically in mesh with the gear 13 and it then thrusts back the latter downwardly by pivoting the swivel arm 14 in the clockwise direction, against the "flexible" pressure of the jack 17. Thus, the swivel arm 14 occupies automatically its meshing position due to the rolling rollers 12a, 13a of the gears 12, 13 coming in contact with one another. The pressure of the pneumatic jack 17 is previously set to a value such that under the effect of the weight of cassette 5, which is exerted on the gear 13, the swivel arm 14 can automatically pivot downwardly. Once the new cassette 5 is set in position, the pressurizing frame 32 is brought back to a horizontal position, it is immobilized by means of the blockage levers 41, and the jacks 36, 37 are fed with pressure so as to apply the desired cutting pressure.

I claim:

1. A rotary cutting apparatus comprising a frame with two parallel and vertical uprights (1, 2) for supporting therebetween an upper cutting cylinder (6) and a lower cutting cylinder (7) having parallel axes, a removable cassette (5) made of two pairs of blocks vertically slideable in two rectangular apertures (4) formed respectively in the upper portions of the two uprights (1, 2) and opening into the upper horizontal faces of these uprights, said two pairs of blocks comprising two opposite upper sliding blocks (24) in which are respectively mounted two opposite coaxial spindles (6a, 6b) for the upper cutting cylinder (6) and two opposite lower sliding blocks (25) in which are respectively rotatably mounted opposite coaxial spindles (7a, 7b) for the lower cutting cylinder (7), and wherein a resilient coupling device is provided on each side of the removable cassette for connecting together the upper (24) and lower (25) sliding blocks whereby said resilient coupling device has a tendency to lift the upper sliding block (24) with respect to the lower block (25) and permits a limited adjustment of a space between the upper sliding block (24) with respect to the lower sliding block (25).

2. The apparatus as set forth in claim 1, wherein the cutting cylinders have a format, and wherein the upper and lower sliding blocks have all the same outside dimensions whatever said format.

3. The apparatus as set forth in claim 1, wherein the upper and lower sliding blocks have a same parallelepipedal shape and are engaged with a tight fit in the rectangular apertures of the uprights.

4. The apparatus as set forth in claim 1, wherein the upper and lower cutting cylinders are respectively rigidly connected to upper and lower rolling rollers, said rolling rollers being fixed to opposite faces of the cutting cylinders, each of said upper sliding blocks having an upper portion formed inwardly in the apparatus by an overhanging portion extending above the upper rolling roller rigidly connected to the upper cutting cylinder, each of said lower sliding blocks having a lower portion formed inwardly in the apparatus by an overhanging portion extending below the lower rolling roller, rigidly connected to the lower cutting cylinder, and above an added abutment which is fixed on an internal face of the corresponding upright, and wherein vertical pressurizing jacks are mounted on an upper portion of the apparatus in order to exert a downward pressure on the overhanging portions of the upper sliding blocks.

5. The apparatus as set forth in claim 4, wherein said added abutment is fixed to the corresponding upright with having an upper horizontal face situated at a level which is slightly above a lower edge of the aperture.

6. The apparatus as set forth in claim 4, wherein the pressurizing frame has, as seen in a plane view, substantially the shape of an "H" and comprises two lateral branches, said lateral branches extending in a longitudinal direction and being connected by a central crossbeam carrying the two vertical pressurizing jacks, said vertical pressurizing jacks each having a downwardly extending stem, the lateral branches of the pressurizing frame having one end pivotally mounted on respective clevisses mounted on the upper portions of the two uprights.

7. The apparatus as set forth in claim 1, further comprising an upper portion provided with a pressurizing frame generally articulated, on one side about a transverse axis, on the upper portions of the two uprights, blockage levers movably mounted on the upper portions of the two uprights being further provided for securing said pressurizing frame against motion in a horizontal position.

8. The apparatus as set forth in claim 1, wherein the spindles of the upper and lower cutting cylinders, which are carried by sliding blocks housed in an upright on one side of the apparatus, are respectively rigidly connected to upper and lower connection gears, the lower connection gear is in mesh with a gear which is part of a swivel arm and the arc of movement of which, in a longitudinal vertical plane, is substantially in alignment with the vertical sliding axis of the cassette, and the gear of the swivel arm being respectively rigidly connected to rolling rollers coming in contact with one another when the gears are in mesh, the swivel arm comprises a horizontal lever carrying the gear, which is articulated at one end about a general control and driving transverse shaft and an other end of which is coupled to an upper end of a stem of a lower vertical jack, the connection gear carried by said horizontal lever being further in mesh with a driving gear rigidly connected to said control and driving transverse shaft.

* * * * *